United States Patent
Wakasa et al.

(10) Patent No.: US 8,536,722 B1
(45) Date of Patent: Sep. 17, 2013

(54) WIND-TURBINE-GENERATOR CONTROL SYSTEM, WIND TURBINE GENERATOR, WIND FARM, AND WIND-TURBINE-GENERATOR CONTROL METHOD

(71) Applicants: Tsuyoshi Wakasa, Tokyo (JP); Hisanobu Shinoda, Tokyo (JP); Hidekazu Ichinose, Tokyo (JP); Yukio Yamashita, Tokyo (JP); Takatoshi Matsushita, Tokyo (JP)

(72) Inventors: Tsuyoshi Wakasa, Tokyo (JP); Hisanobu Shinoda, Tokyo (JP); Hidekazu Ichinose, Tokyo (JP); Yukio Yamashita, Tokyo (JP); Takatoshi Matsushita, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/752,965

(22) Filed: Jan. 29, 2013

Related U.S. Application Data

(63) Continuation of application No. PCT/JP2013/050844, filed on Jan. 17, 2013.

(51) Int. Cl.
*H02P 9/04* (2006.01)
*H02P 11/00* (2006.01)

(52) U.S. Cl.
USPC .................................. 290/44; 290/55; 322/20

(58) Field of Classification Search
USPC .......................... 290/43, 44, 55; 322/20, 37
See application file for complete search history.

(56) References Cited

U.S. PATENT DOCUMENTS

| | | | | |
|---|---|---|---|---|
| 6,856,038 | B2 * | 2/2005 | Rebsdorf et al. | 290/44 |
| 7,015,595 | B2 * | 3/2006 | Feddersen et al. | 290/44 |
| 7,081,689 | B2 | 7/2006 | Tilscher et al. | |
| 7,397,143 | B2 | 7/2008 | Walling | |
| 7,605,487 | B2 | 10/2009 | Barton et al. | |
| 7,794,348 | B2 | 9/2010 | Tilscher et al. | |
| 7,914,411 | B2 | 3/2011 | Basteck | |
| 8,076,790 | B2 * | 12/2011 | Ichinose et al. | 290/44 |
| 8,242,619 | B2 * | 8/2012 | Arinaga et al. | 290/44 |
| 2009/0317266 | A1 | 12/2009 | Rampen et al. | |

FOREIGN PATENT DOCUMENTS

| | | |
|---|---|---|
| JP | 2009044836 A | 2/2009 |
| JP | 2010071156 A | 4/2010 |
| JP | 2011182516 A | 9/2011 |
| JP | 2011217574 A | 10/2011 |

OTHER PUBLICATIONS

International Search Report for PCT/JP2013/050844 completed Apr. 15, 2013.

\* cited by examiner

*Primary Examiner* — Nicholas Ponomarenko
(74) *Attorney, Agent, or Firm* — Kanesaka Berner & Partners, LLP

(57) ABSTRACT

In a wind turbine generator, the rotation of the rotor is speeded up by a hydraulic pump and a hydraulic motor and is transferred to a synchronous generator. In a state in which the wind turbine generator is interconnected to a utility grid, and the synchronous generator reaches a synchronous speed, if no mechanical power is transferred to the synchronous generator, a wind-turbine control system operates the synchronous generator as a synchronous condenser, thus controlling the magnitude of the field current of the synchronous generator. Thus, the wind turbine generator can supply reactive power to the utility grid without adding new equipment, such as a reactive power compensator using a semiconductor switch.

11 Claims, 10 Drawing Sheets

WIND-TURBINE-GENERATOR CONTROL SYSTEM, WIND TURBINE GENERATOR, WIND FARM, AND WIND-TURBINE-GENERATOR CONTROL METHOD

CROSS REFERENCE TO RELATED APPLICATIONS

This is a continuation of International Application PCT/JP2013/50844, with an international filing date of Jan. 17, 2013, which is hereby incorporated by reference herein in its entirety.

TECHNICAL FIELD

The present invention relates to a wind-turbine-generator control system, a wind turbine generator, a wind farm, and a wind-turbine-generator control method.

BACKGROUND ART

A wind turbine generator, which transmits generated electrical power to a utility grid, is required to contribute to stabilization of the utility grid. In order to stabilize the utility grid, it is necessary to stabilize the frequency (grid frequency) and the voltage (grid voltage) within predetermined ranges.

In order to stabilize the grid voltage, it is necessary to supply or absorb reactive power. It is desired that, as much as possible, supply or absorption of reactive power be performed continuously. Furthermore, when an accident occurs in the utility grid or when the load is increased rapidly, it is desired that supply or absorption of reactive power be performed as quickly as possible.

As devices for performing such supply or absorption of reactive power, reactive power compensators, such as an SVC (static var compensator) and a STATCOM (static synchronous compensator), have been developed and put to practical use. In particular, the STATCOM is capable of performing quick and continuous control of reactive power, which is effective in stabilizing the grid power.

Furthermore, PTLs 1 and 2 describe wind turbine generators including a power converter (inverter) in which a generator power converter connected to a generator and a utility-grid power converter connected to a utility grid are connected with a DC circuit, and the utility-grid power converter is used as a reactive power compensator, to supply reactive power to the utility grid.

CITATION LIST

Patent Literature

{PTL 1} U.S. Pat. No. 7,605,487
{PTL 2} U.S. Pat. No. 7,397,143

SUMMARY OF INVENTION

Technical Problem

However, in the reactive power compensators, such as the STATCOM, and the power converter that is used as a reactive power compensator described in PTLs 1 and 2, a semiconductor switch is quickly turned on and off by PWM (pulse width modulation), thus generating electromagnetic noise and harmonics. Because the electromagnetic noise and harmonics may cause an adverse effect on the other apparatuses interconnected to the same utility grid, the electromagnetic noise and harmonics need to be removed with filters etc. However, since the required filters etc. are large in size and weight, and the semiconductor switch is delicate, it is necessary to enhance the protection circuit for the semiconductor switch and to do periodic maintenance.

The present invention has been made in view of such circumstances, and an object thereof is to provide a wind-turbine-generator control system, a wind turbine generator, a wind farm, and a wind-turbine-generator control method capable of supplying reactive power to the utility grid without using a reactive power compensator.

Solution to Problem

In order to solve the above-described problems, the wind-turbine-generator control system, the wind turbine generator, the wind farm, and the wind-turbine-generator control method of the present invention employ the following solutions.

According to a first aspect, the present invention provides a wind-turbine-generator control system for a wind turbine generator that generates power with a synchronous generator through rotation of a rotor having blades, including a generator control unit for operating the synchronous generator as a synchronous condenser in a state in which the wind turbine generator is interconnected to a utility grid, and the synchronous generator reaches a synchronous speed, if mechanical power transferred to the synchronous generator is equal to or lower than a predetermined value, thus controlling a magnitude of field current of the synchronous generator.

According to this configuration, the wind turbine generator generates power with the synchronous generator through rotation of the rotor having the blades.

A determination unit of the control system determines whether mechanical power transferred to the synchronous generator is equal to or lower than the predetermined value, in the state in which the wind turbine generator is interconnected to the utility grid, and the synchronous generator reaches the synchronous speed.

The state in which the wind turbine generator is interconnected to the utility grid, and the synchronous generator reaches the synchronous speed corresponds to a state in which the synchronous generator can be rotated even with no load. In this state, by controlling the magnitude of the field current of the synchronous generator, the magnitude of the reactive power to be supplied to the utility grid can be controlled. Even when no mechanical power is transferred to the synchronous generator, for example, even when the rotation of the rotor is stopped because there is no wind, the interconnected synchronous generator can be used as a synchronous condenser that supplies or absorbs reactive power to or from the utility grid.

Then, if the mechanical power transferred to the synchronous generator is equal to or lower than the predetermined value, the generator control unit operates the synchronous generator as the synchronous condenser, thus controlling the magnitude of the field current of the synchronous generator.

The mechanical power that is equal to or lower than the predetermined value corresponds to the mechanical power that is equal to or lower than mechanical power allowing output of an active power corresponding to the power consumption of the wind turbine generator. Specifically, example cases of the state in which the mechanical power is equal to or lower than the predetermined value include a state in which the mechanical power transferred to the synchronous generator is 0 (zero). Furthermore, when the synchronous generator is operated as the synchronous condenser if the mechanical power transferred to the synchronous generator is the predetermined value in which is higher than 0, it is possible to supply reactive power to the utility grid and also to supply active power for the power consumption of the wind turbine generator to the utility grid.

In this way, in this configuration, the timing at which the mechanical power transferred to the synchronous generator becomes equal to or lower than the predetermined value is used as a trigger to switch the synchronous generator to the synchronous condenser; therefore, it is possible to supply reactive power to the utility grid without using a reactive power compensator.

In the above-described first aspect, it is preferable that the wind turbine generator be provided with a hydraulic pump that pumps hydraulic oil by rotation of the rotor; a hydraulic motor that is rotated with the hydraulic oil pumped out from the hydraulic pump, thus rotationally driving the synchronous generator at a rotational speed that is equal to or higher than a rotational speed of the rotor; and an accumulator that is provided in a high-pressure pipe for delivering the hydraulic oil from the hydraulic pump to the hydraulic motor and that accumulates the hydraulic oil flowing from or to the hydraulic pump and the hydraulic motor, and the wind-turbine-generator control system further include a hydraulic control unit for controlling the hydraulic pump and the hydraulic motor.

According to this configuration, with the hydraulic pump and the hydraulic motor, the synchronous generator is rotationally driven at a rotational speed equal to or higher than the rotational speed of the rotor. Furthermore, the accumulator, which is provided in the high-pressure pipe for delivering the hydraulic oil from the hydraulic pump to the hydraulic motor, accumulates the hydraulic oil flowing from or to the hydraulic motor. Then, the hydraulic control unit controls the hydraulic pump and the hydraulic motor. Therefore, in this configuration, by controlling the hydraulic pump and the hydraulic motor, the synchronous generator can be more effectively utilized as the synchronous condenser.

In the above-described first aspect, it is preferable that, when the synchronous generator has not reached the synchronous speed, the hydraulic control unit rotate the hydraulic motor with the hydraulic oil accumulated in the accumulator, thus making the synchronous generator reach the synchronous speed.

According to this configuration, the hydraulic oil accumulated in the accumulator is used to rotate the hydraulic motor, thus making the synchronous generator reach the synchronous speed; therefore, the synchronous generator can be operated as the synchronous condenser irrespective of the wind speed. Note that the accumulator needs to have a capacity for accumulating sufficient hydraulic oil for making the synchronous generator reach the synchronous speed from a windless state, for example.

In the above-described first aspect, it is preferable that the generator control unit operate the synchronous generator as the synchronous motor, thereby operating the hydraulic motor as a hydraulic pump and pressurizing and accumulating the hydraulic oil in the accumulator even when the rotor is not rotated.

According to this configuration, by using the synchronous generator as the synchronous motor, surplus power (active power) in the utility grid can be consumed by the wind turbine generator. With the surplus power, the synchronous generator is operated as the synchronous motor, thus operating the hydraulic motor as a hydraulic pump. As a result, the surplus power is accumulated as the pressure energy of the hydraulic oil in the accumulator. Furthermore, thereafter, the pressure energy can be used as energy causing the synchronous generator to rotate. Therefore, in this configuration, the surplus power in the utility grid can be accumulated or released.

In the above-described first aspect, it is preferable that, if the mechanical power transferred to the synchronous generator is higher than the predetermined value, the synchronous generator stop being used as the synchronous condenser and generate power.

According to this configuration, it is possible to switch between supply of reactive power to the utility grid through the use of the synchronous generator as the synchronous condenser and power generation performed by the synchronous generator, according to the magnitude of the mechanical power transferred to the synchronous generator, that is, according to the wind speed. Therefore, in this configuration, the wind turbine generator can be efficiently utilized.

In the above-described first aspect, it is preferable that whether the mechanical power transferred to the synchronous generator is equal to or lower than the predetermined value be determined based on the wind speed or the rotational speed of the rotor.

According to this configuration, the timing at which to operate the synchronous generator as the synchronous condenser can be easily determined.

According to a second aspect, the present invention provides a wind turbine generator including the above-described wind-turbine-generator control system.

According to a third aspect, the present invention provides a wind farm including a plurality of the wind turbine generators described above.

In the above-described third aspect, it is preferable that the synchronous generators of the plurality of wind turbine generators be used as synchronous condensers according to the total amount of reactive power to be supplied to the utility grid.

According to this configuration, in order to supply reactive power to the utility grid, the wind turbine generators provided in the wind farm can be efficiently used.

In the above-described third aspect, it is preferable that generated output powers of some or all of the wind turbine generators that are operated in a normal operation mode be limited or stopped, thus increasing adjustable reactive power.

According to this configuration, the reactive power that can be supplied to the utility grid can be increased even more. Note that the normal operation mode is an operation mode used when the wind speed is higher than the cut-in wind speed or is lower than the cut-out wind speed.

According to a fourth aspect, the present invention provides a wind-turbine-generator control method for a wind turbine generator that generates power with a synchronous generator through rotation of a rotor having blades, the control method including operating the synchronous generator as a synchronous condenser in a state in which the wind turbine generator is interconnected to a utility grid, and the synchronous generator reaches a synchronous speed, if mechanical power transferred to the synchronous generator is equal to or lower than a predetermined value, thus controlling a magnitude of field current of the synchronous generator.

Advantageous Effects of Invention

According to the present invention, an advantageous effect is afforded in that it is possible to supply reactive power to the utility grid without using a reactive power compensator.

DESCRIPTION OF EMBODIMENTS

A wind-turbine-generator control system, a wind turbine generator, a wind farm, and a wind-turbine-generator control method according to an embodiment of the present invention will be described below with reference to the drawings.

First Embodiment

A first embodiment of the present invention will be described below.

Figure 1:
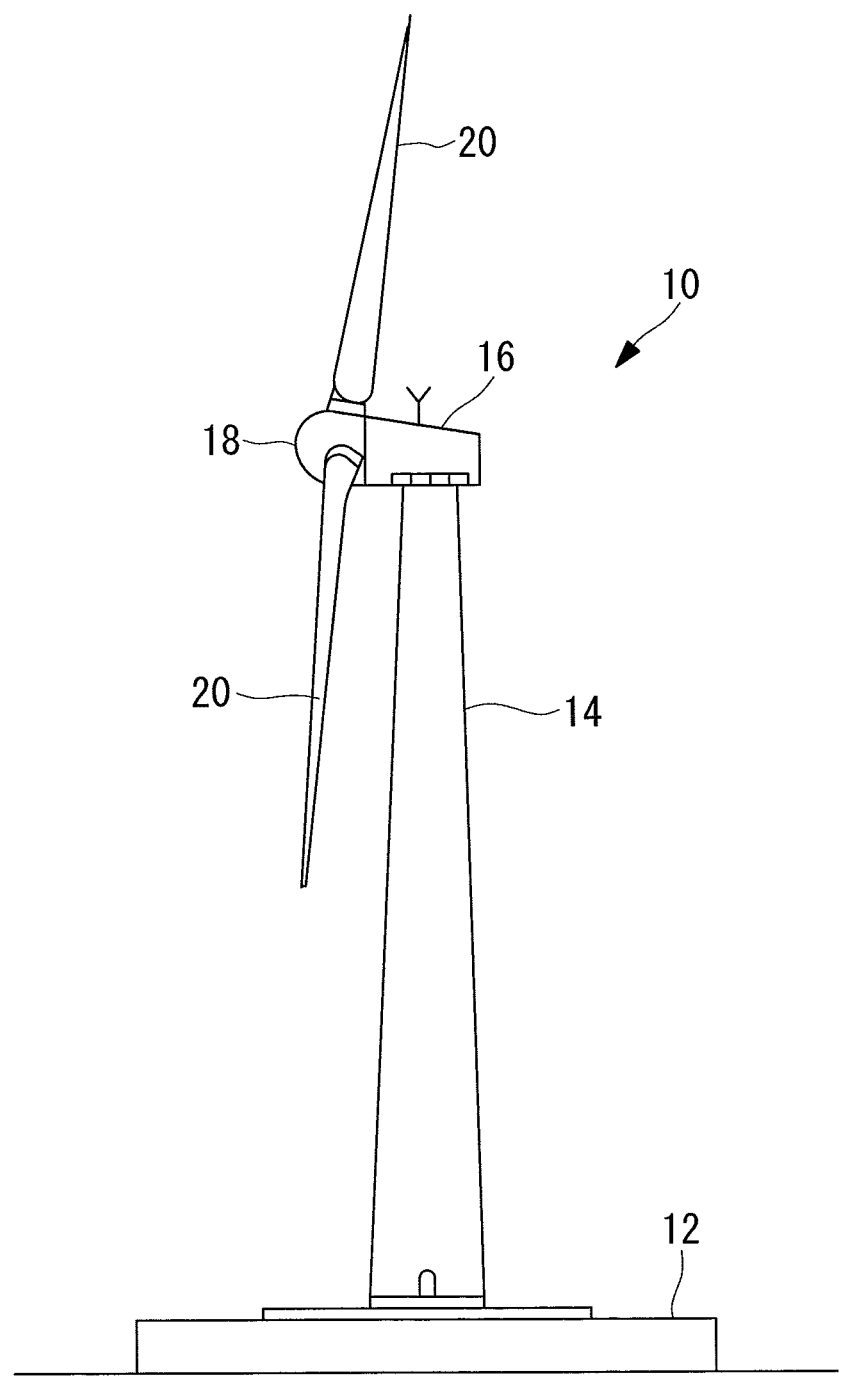
FIG. 1 is an external view of a wind turbine generator according to a first embodiment of the present invention.

FIG. 1 is an external view of a wind turbine generator 10 according to the first embodiment.

The wind turbine generator 10 of the first embodiment is interconnected to a utility grid to transmit generated electrical power to the utility grid and is installed on the ocean, for example. The wind turbine generator 10 includes a tower (supporting column) 14 that is provided upright on a foundation 12, a nacelle 16 that is provided on the top of the tower 14, and a rotor 18 that is provided on the nacelle 16 so as to be capable of rotating about a substantially horizontal axis.

A plurality of (for example, three in this embodiment) blades 20 are attached to the rotor 18 in a radiating pattern from the rotational axis of the rotor 18. With this structure, the force of wind striking the blades 20 from the direction of the rotational axis of the rotor 18 is converted to mechanical power causing the rotor 18 to rotate about the rotational axis, and the mechanical power is converted to electrical power by a generator. Note that the blades 20 are coupled to the rotor 18 so as to be capable of turning with respect to the wind direction, and the pitch angles of the blades 20 can be changed.

Figure 2:
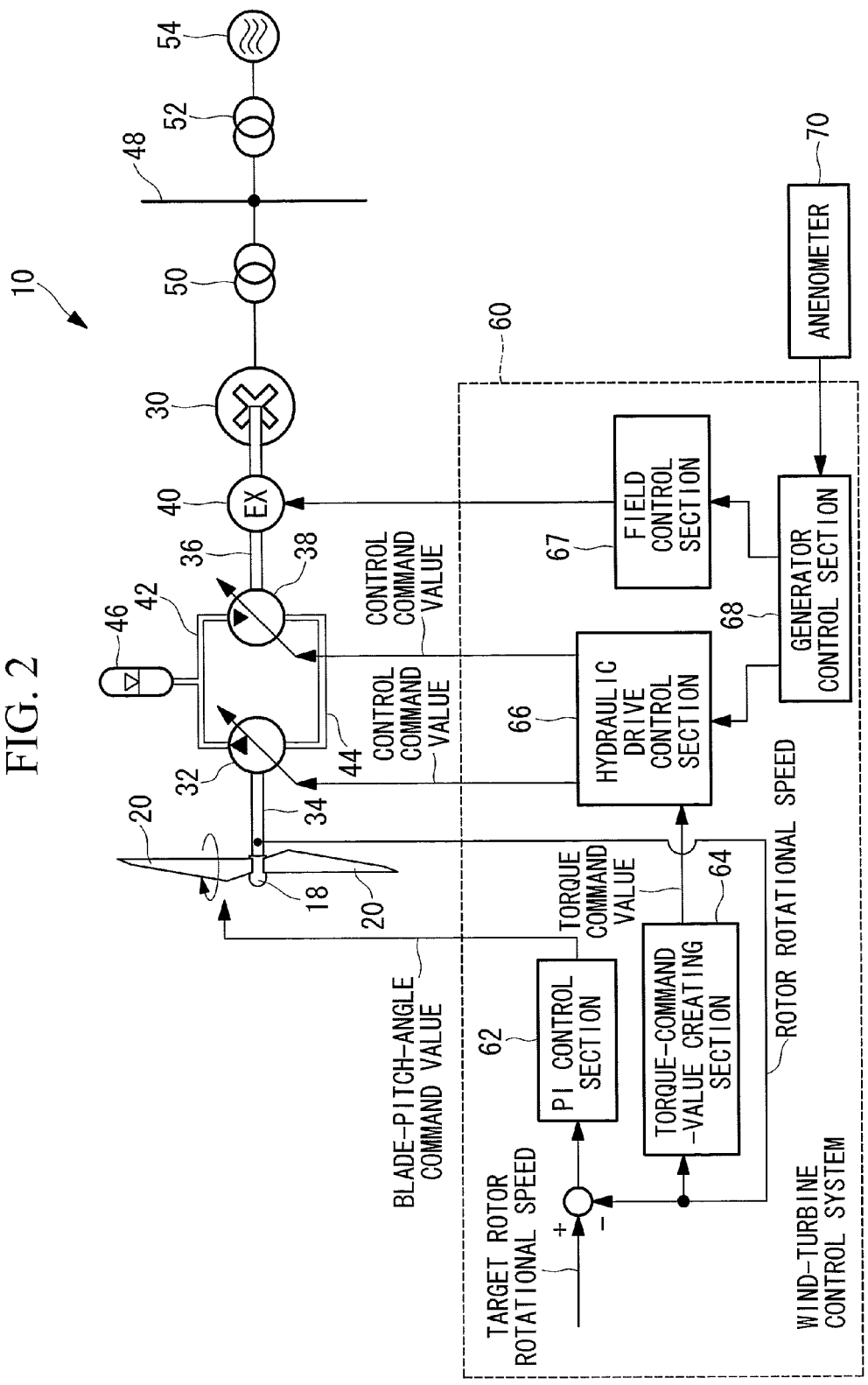
FIG. 2 is a diagram schematically showing the electrical configuration of the wind turbine generator of the first embodiment of the present invention and a structure in which the rotation of a rotor is speeded up by using hydraulic pressure and is transferred to a synchronous generator.

FIG. 2 is a diagram schematically showing the electrical configuration of the wind turbine generator 10 of the first embodiment and a structure in which the rotation of the rotor 18 is speeded up by using hydraulic pressure and is transferred to a synchronous generator 30 (rotor-type synchronous generator).

A rotor shaft 34 is provided on the rotor 18 so as to be directed to the inside of the nacelle 16, and a petal-shaped cam (not shown) having a plurality of peaks and troughs alternately provided in the circumferential direction is connected to the end of the rotor shaft 34.

A hydraulic pump 32 that pumps, with a plurality of pistons provided in a radiating pattern from the rotor shaft 34, hydraulic oil in cylinders corresponding to the pistons is provided around the cam. Then, when the cam is rotated through rotation of the rotor 18, the pistons of the hydraulic pump 32 are brought into contact with the peaks and the troughs of the cam, alternately. When the pistons of the hydraulic pump 32 are brought into contact with the peaks of the cam, the pistons deliver the hydraulic oil to the outsides of the cylinders, and, when the pistons are brought into contact with the troughs, the pistons suction the hydraulic oil to the insides of the cylinders.

On the other hand, a hydraulic motor 38 that speeds up the rotation of the rotor 18 and transfers it to the synchronous generator 30 is provided at an end of a shaft 36 of the synchronous generator 30. Specifically, the hydraulic motor 38 is rotated by the hydraulic oil delivered from the hydraulic pump 32, thus rotationally driving the synchronous generator 30 at a rotational speed equal to or higher than the rotational speed of the rotor 18, that is, at a higher speed than the rotor 18. Note that an exciter 40 for the synchronous generator 30 is provided on the shaft 36.

The hydraulic motor 38 has a plurality of cylinders arranged in a radiating pattern from a crank shaft, and pistons provided in the cylinders are connected to the crank shaft via an eccentric cam portion of the crank shaft. Then, the hydraulic oil is delivered from the hydraulic pump 32 to the cylinders of the hydraulic motor 38 via a high-pressure manifold 42, thus reciprocating the pistons provided in the cylinders; and the crank shaft of the hydraulic motor 38 is rotated, thus rotating the shaft 36 of the synchronous generator 30 connected to the crank shaft. Furthermore, the hydraulic oil pumped out of the cylinders of the hydraulic motor 38 returns to the hydraulic pump 32 via a low-pressure manifold 44.

In this way, the high-pressure manifold 42 delivers the hydraulic oil from the hydraulic pump 32 to the hydraulic motor 38, and the low-pressure manifold 44 delivers the hydraulic oil from the hydraulic motor 38 to the hydraulic pump 32.

The high-pressure manifold 42 is provided with an accumulator 46 that accumulates the hydraulic oil flowing from or to the hydraulic pump 32 and the hydraulic motor 38.

The synchronous generator 30 is rotationally driven to generate power, is connected to a bus 48, to which other wind turbine generators 10 are connected, via a boosting transformer 50, and is then connected to a utility grid 54 via an interconnection transformer 52. Thus, the wind turbine generator 10 can transmit the generated output power to the utility grid 54.

Furthermore, the wind turbine generator 10 includes a wind-turbine control system 60 that controls the wind turbine generator 10. The wind-turbine control system 60 is configured, for example, of a CPU (central processing unit), a RAM (random access memory), and a computer-readable storage medium. A series of processing steps for realizing the functions of a PI control section 62, a torque-command-value creating section 64, a hydraulic drive control section 66, a field (excitation) control section 67, and a generator control section 68, to be described later, is stored in the storage medium in the form of a program, for example, and the CPU reads out the program to the RAM to execute information processing and arithmetic processing, thereby realizing the functions.

In the wind-turbine control system 60, the difference between a target rotor rotational speed indicating a target value of the rotational speed of the rotor 18 and the rotor rotational speed that is a measured rotational speed of the rotor 18 is input to the PI control section 62, and a blade-pitch-angle command value is created such that the rotational speed of the rotor 18 becomes the target rotor rotational speed and is output to a pitch actuator (not shown) that changes the blade pitch angles.

Furthermore, in the wind-turbine control system 60, the torque-command-value creating section 64 creates a torque command value according to the rotor rotational speed and outputs it to the hydraulic drive control section 66, which controls the hydraulic pump 32 and the hydraulic motor 38. Note that the torque-command-value creating section 64 has table information indicating optimum torque command values for rotor rotational speeds and creates a torque command value based on the table information.

The hydraulic drive control section 66 outputs control command values for driving the hydraulic pump 32 and the hydraulic motor 38 to the hydraulic pump 32 and the hydraulic motor 38.

The pistons of the hydraulic pump 32 and the hydraulic motor 38 can each be selected to be driven or not driven by opening and closing valves that control the flows of hydraulic oil into and from the cylinders.

When the torque command value is received, the hydraulic drive control section 66 of the first embodiment calculates a drive command value for the pistons constituting the hydraulic pump 32 (hereinafter, referred to as "piston drive command value") based on the result obtained by dividing the maximum torque that can be output by the hydraulic pump 32 by the torque command value. The piston drive command value is included in the control command value and is input to the hydraulic pump 32. The hydraulic pump 32 changes the number of pistons to be driven, according to the piston drive command value, thus changing the quantity of hydraulic oil to be delivered. Similarly, the hydraulic motor 38 changes the number of pistons to be driven, according to the piston drive command value, thus outputting a torque and rotational speed according to the torque command value. Then, the torque is transferred to the generator 30 via the shaft 36, and the generator 30 generates power. Note that the generated output power of the generator 30 corresponds to the product of the torque and the rotational speed of the generator 30 (hereinafter, referred to as "generator rotational speed").

Furthermore, the wind-turbine control system 60 includes the field control section 67 that controls the synchronous generator 30. The field control section 67 controls the exciter 40, thereby changing the magnitude of the field current of the synchronous generator 30 and controlling the reactive power and the active power output from the synchronous generator 30.

Furthermore, in a state in which the wind turbine generator 10 is interconnected to the utility grid 54, and the synchronous generator 30 reaches a synchronous speed, if the mechanical power transferred to the synchronous generator 30 is equal to or lower than a predetermined value, the field control section 67 of the first embodiment operates the synchronous generator 30 as a synchronous condenser, thus controlling the magnitude of the field current of the synchronous generator 30.

The state in which the wind turbine generator 10 is interconnected to the utility grid 54, and the synchronous generator 30 reaches the synchronous speed corresponds to a state in which the synchronous generator 30 can rotate even with no load. In this state, by controlling the magnitude of the field current of the synchronous generator 30, the magnitude of the reactive power to be supplied to the utility grid 54 can be controlled. Even when no mechanical power is transferred to the synchronous generator 30, for example, even when the rotation of the rotor 18 is stopped because there is no wind, the interconnected synchronous generator 30 can be used as a synchronous condenser that supplies or absorbs reactive power to or from the utility grid 54.

Furthermore, the generator control section 68 of the wind-turbine control system 60 receives the measurement result of the wind speed measured by an anenometer 70 provided near the wind turbine generator 10 and the rotor rotational speed. Then, the generator control section 68 outputs, to the hydraulic drive control section 66 and the field control section 67, control signals indicating starting or stopping of power generation, according to the wind-speed measurement result and the rotor rotational speed.

Figure 3:
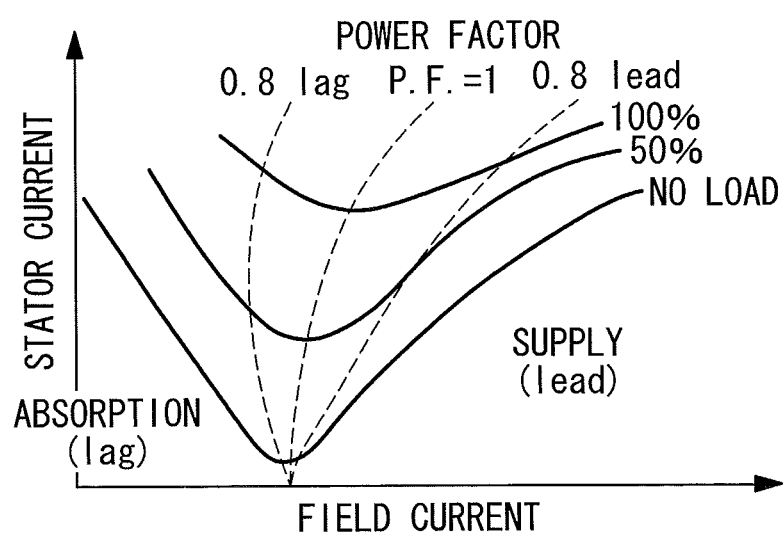
FIG. 3 is a graph showing a V-curve of the synchronous motor.

FIG. 3 is a general graph indicating a V-curve of the synchronous motor.

In the graph shown in FIG. 3, the horizontal axis indicates the field current, and the vertical axis indicates stator current; the graph shows that the stator current changes in a V-shaped manner according to the magnitude of the field current.

Then, as described above, the synchronous generator 30 is operated as the synchronous condenser in the no-load state. With a power factor of 1 serving as the border between supply and absorption, the synchronous generator 30 can supply reactive power to the utility grid 54 by increasing the field current and can absorb reactive power from the utility grid 54 by reducing the field current.

Note that, in the wind turbine generator 10 of the first embodiment, the mechanical power equal to or lower than the above-described predetermined value is set to 0 (zero), as an example. The case where the mechanical power transferred to the synchronous generator 30 is 0, that is, the case where no mechanical power is transferred to the synchronous generator 30, corresponds, for example, to a state in which the rotor 18 is not rotated, that is, a case where the wind speed is equal to or lower than the cut-in wind speed or is equal to or higher than the cut-out wind speed, in the normal operating state of the wind turbine generator 10. Thus, the wind turbine generator 10 can easily determine the timing at which to operate the synchronous generator 30 as the synchronous condenser.

The field control section 67 of the first embodiment performs processing using the synchronous generator 30 as the synchronous condenser (hereinafter, referred to as "phase modifying processing") based on the measurement result received from the anenometer 70.

Figure 4:
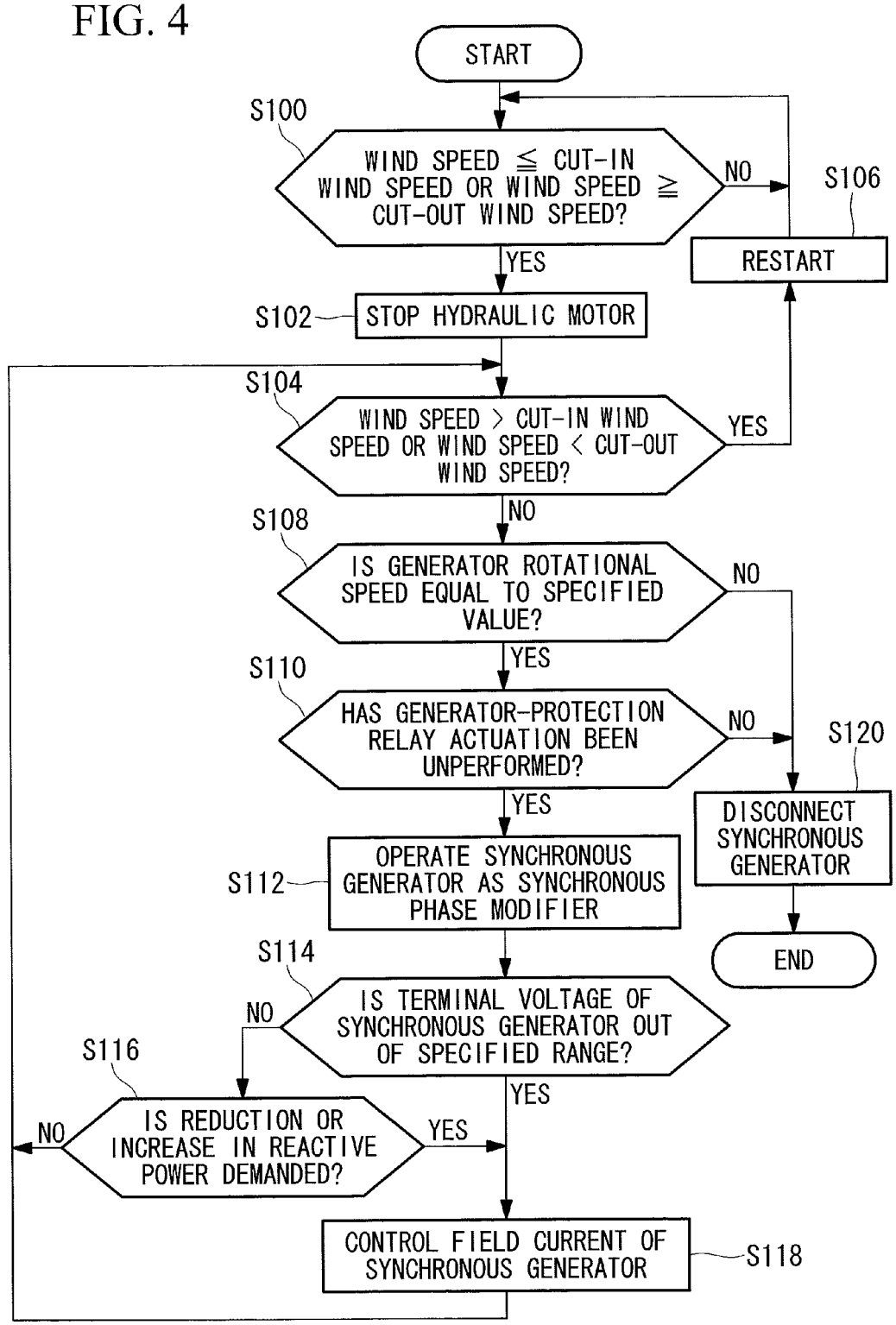
FIG. 4 is a flowchart showing the flow of phase modifying processing performed by the wind turbine generator according to the first embodiment of the present invention.

FIG. 4 is a flowchart showing the flow of processing of a program executed by the field control section 67 when the phase modifying processing of the wind turbine generator 10 of the first embodiment is performed. The program is stored in advance in the wind-turbine control system 60. Note that, as described above, the phase modifying processing is performed in a state in which the synchronous generator 30 is operated while being interconnected to the utility grid 54.

First, in Step 100, the result of determination, performed by the generator control section 68 based on the measurement result received from the anenometer 70, as to whether the wind speed is equal to or lower than the cut-in wind speed or is equal to or higher than the cut-out wind speed is input. If the determination result is affirmative, the processing flow advances to Step 102. If the determination result is negative, the synchronous generator 30 is made to continue to generate power.

In Step 102, since the torque command value created by the torque-command-value creating section 64 indicates that the torque is 0 (zero) because the wind speed is equal to or lower than the cut-in wind speed or is equal to or higher than the cut-out wind speed, the hydraulic motor 38 is stopped based on this torque command value. Note that, in this case, the blade pitch angles of the blades 20 are controlled so as to be set at the farthest feather side.

In Step 104, the result of determination, performed by the generator control section 68 based on the measurement result received from the anenometer 70, as to whether the wind speed is higher than the cut-in wind speed or is lower than the cut-out wind speed is input. If the determination result is affirmative, the processing flow advances to Step 108. If the determination result is negative, the processing flow advances to Step 106.

The case where the determination result is affirmative in Step 104 corresponds to a case where the rotor 18 can be rotated. In this case, mechanical power transferred to the synchronous generator 30 exceeds the predetermined value (0 in the first embodiment), and, in Step 106, the synchronous generator 30 stops being used as the synchronous condenser, and the synchronous generator 30 is restarted to generate power.

In Step 108, it is determined whether the generator rotational speed is equal to a specified value. If the determination result is affirmative, the processing flow advances to Step 110. If the determination result is negative, the processing flow advances to Step 120.

In Step 110, it is determined whether generator-protection relay actuation for protecting the synchronous generator 30 has been unperformed. If the determination result is affirmative, the processing flow advances to Step 112. If the determination result is negative, the processing flow advances to Step 120.

In Step 112, the synchronous generator 30 starts to be operated as the synchronous condenser, to control the field current. In this way, in the wind turbine generator 10 of the first embodiment, the timing at which the mechanical power transferred to the synchronous generator 30 becomes equal to or lower than the predetermined value (0 (zero) in the first embodiment) is used as a trigger to switch the synchronous generator 30 to the synchronous condenser.

In the next Step 114, it is determined whether the terminal voltage of the synchronous generator 30 operated as the synchronous condenser is out of a specified range. If the determination result is affirmative, the processing flow advances to Step 118. If the determination result is negative, the processing flow advances to Step 116.

In Step 116, it is determined whether a reduction or increase in reactive power has been demanded by the manager of the utility grid 54 (hereinafter, referred to as "grid manager"). If the determination result is affirmative, the processing flow advances to Step 118. If the determination result is negative, the processing flow returns to Step 104, and this processing is repeated until the wind turbine generator 10 is stopped.

In Step 118, the magnitude of the field current of the synchronous generator 30 is controlled, thereby outputting a desired terminal voltage or reactive power from the synchronous generator 30 operated as the synchronous condenser. Then, the processing flow returns to Step 104, and this processing is repeated until the wind turbine generator 10 is stopped.

On the other hand, if the determination result is negative in Step 108 or Step 110, the synchronous generator 30 cannot be interconnected. Therefore, in Step 120, the synchronous generator 30 is disconnected from the utility grid 54, and this processing ends.

Furthermore, in the wind turbine generator 10 of the first embodiment, the rotation of the rotor 18 is speeded up by the hydraulic pump 32 and the hydraulic motor 38 and is transferred to the synchronous generator 30. Therefore, in the wind turbine generator 10 of the first embodiment, by controlling the hydraulic pump 32 and the hydraulic motor 38, the synchronous generator 30 can be more effectively utilized as the synchronous condenser.

For example, even when supply of reactive power is demanded by the utility grid 54, thus causing a need to use the synchronous generator 30 as the synchronous condenser, if the synchronous generator 30 has not reached the synchronous speed, the synchronous generator 30 cannot be operated as the synchronous condenser. Such a case occurs when there is no wind, for example.

Thus, when the synchronous generator 30 has not reached the synchronous speed, the hydraulic drive control section 66 supplies the pressurized hydraulic oil accumulated in the accumulator 46 to the high-pressure manifold 42 to rotate the hydraulic motor 38, thus making the synchronous generator 30 reach the synchronous speed. Specifically, the pressure energy of the hydraulic oil accumulated in the accumulator 46 is used as energy for speeding up the synchronous generator 30. Thus, the wind turbine generator 10 can operate the synchronous generator 30 as the synchronous condenser irrespective of the wind speed.

Note that the accumulator 46 needs to have a capacity for accumulating sufficient hydraulic oil for making the synchronous generator reach the synchronous speed from a windless state, for example. Furthermore, the hydraulic drive control section 66 stops the hydraulic motor 38 when the synchronous generator 30 reaches the synchronous speed.

Furthermore, when the wind turbine generator 10 is stopped for a reason other than a failure, for example, because the wind speed is equal to or lower than the cut-in wind speed or is equal to or higher than the cut-out wind speed, the generator control section 68 operates the synchronous generator 30 as the synchronous motor, thereby performing control in which the hydraulic motor 38 is operated as a hydraulic pump to cause the accumulator 46 to pressurize and accumulate the hydraulic oil even when the rotor 18 is not rotated (hereinafter, referred to as "accumulation processing"). Note that, in this case, the hydraulic pump 32 is stopped.

Figure 5:
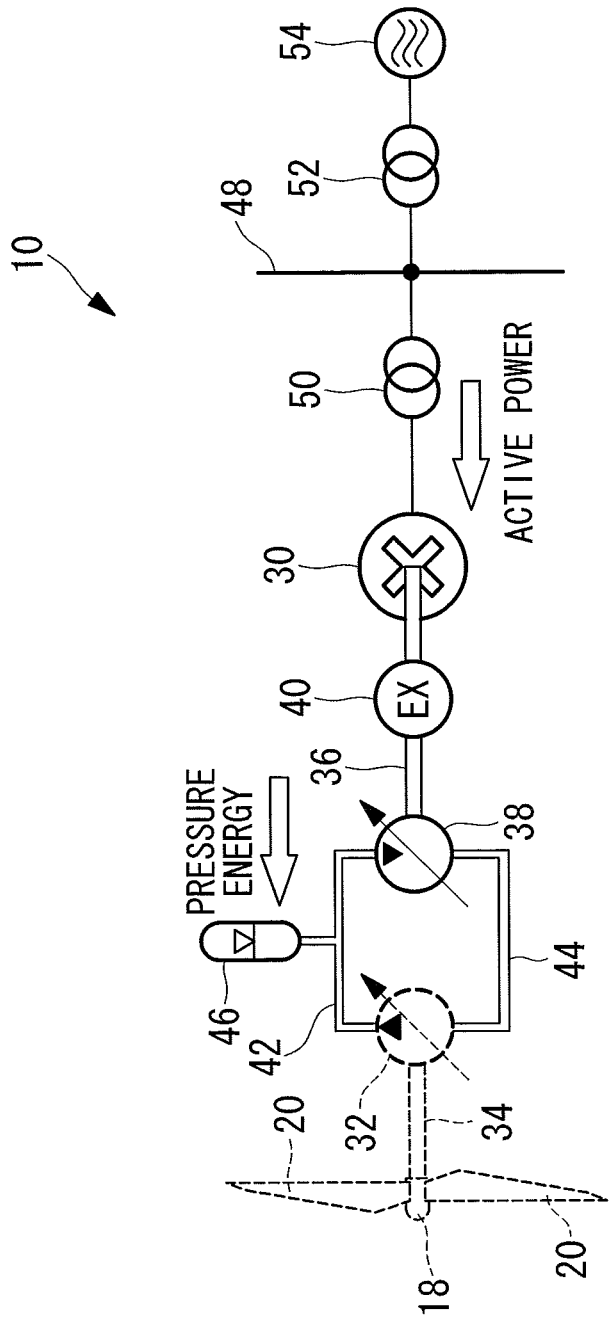
FIG. 5 is a diagram schematically showing a case where the wind turbine generator according to the first embodiment of the present invention accumulates, as pressure energy, active power supplied from a utility grid.

By using the synchronous generator 30 as the synchronous motor, surplus power (active power) in the utility grid 54 can be consumed by the wind turbine generator 10, as shown in FIG. 5. Then, the surplus power is accumulated as the pressure energy of the hydraulic oil in the accumulator 46. Furthermore, thereafter, the pressure energy can be used as energy causing the synchronous generator 30 to rotate. In this way, the wind turbine generator 10 of the first embodiment can accumulate and release the surplus power in the utility grid 54.

As described above, in the state in which the wind turbine generator 10 is interconnected to the utility grid 54, and the synchronous generator 30 reaches the synchronous speed, if no mechanical power is transferred to the synchronous generator 30, the wind-turbine control system 60 of the wind turbine generator 10 of the first embodiment operates the synchronous generator 30 as the synchronous condenser, thus controlling the magnitude of the field current of the synchronous generator. Therefore, according to the wind turbine generator 10 of the first embodiment, it is possible to supply the reactive power to the utility grid 54 without adding new equipment, such as a reactive power compensator using a semiconductor switch.

Second Embodiment

A second embodiment of the present invention will be described below.

Figure 6:
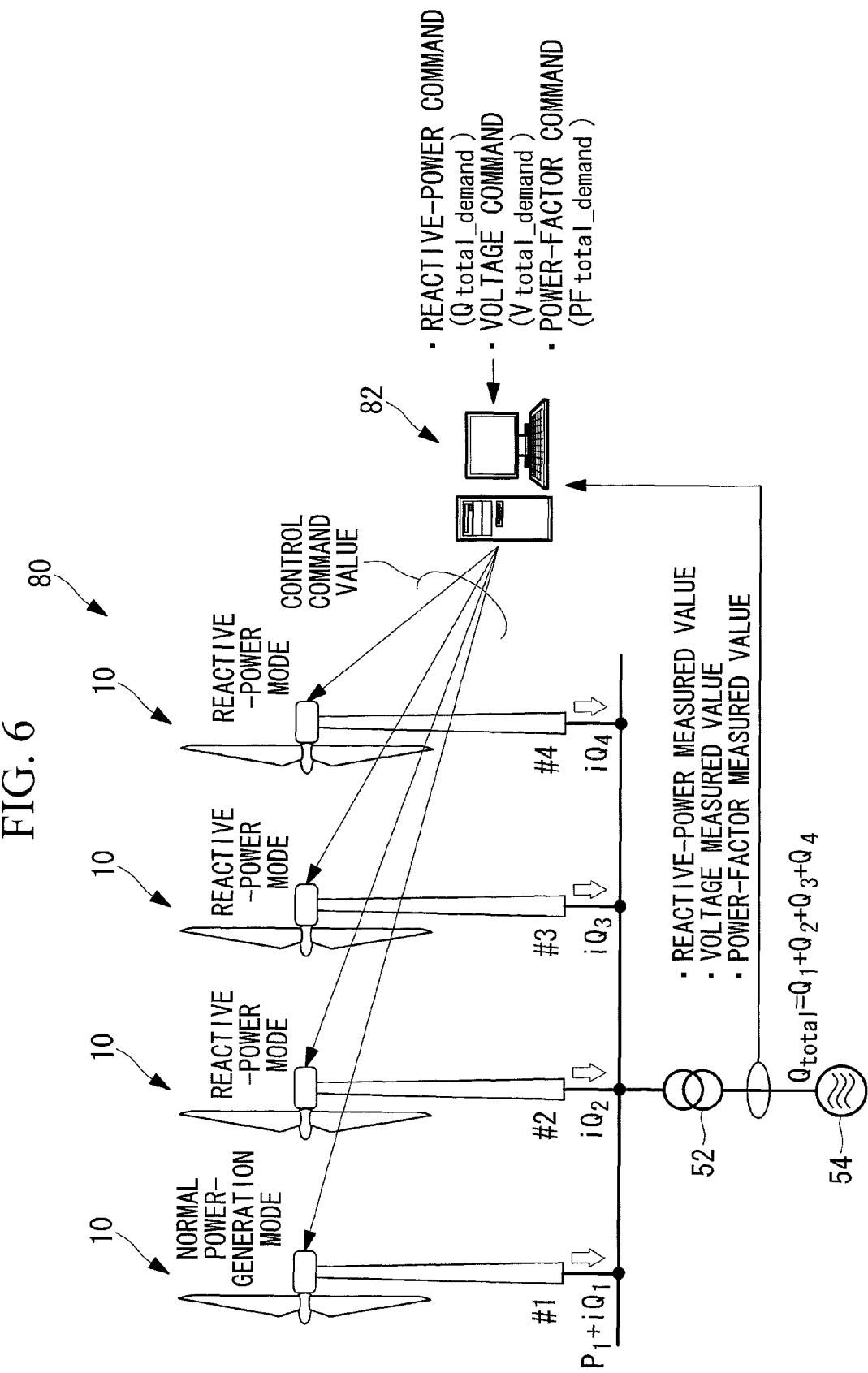
FIG. 6 is a view showing the configuration of a wind farm according to a second embodiment of the present invention.

FIG. 6 is a view showing the overall configuration of a wind farm 80 according to the second embodiment.

The wind farm 80 includes a plurality of wind turbine generators 10 and a wind-farm control system 82 that sends control signals to the wind turbine generators 10.

Since the configuration of the wind turbine generators 10 of the second embodiment is the same as the configuration of the wind turbine generator 10 of the first embodiment, shown in FIGS. 1 and 2, a description thereof will be omitted.

The wind-farm control system 82 is configured, for example, of a CPU (central processing unit), a RAM (random access memory), and a computer-readable storage medium, which are not shown.

The wind farm 80 of the second embodiment performs reactive-power handling processing in which the synchronous generators provided in the plurality of wind turbine generators 10 are used as synchronous condensers, according to the total amount of reactive power to be supplied to the utility grid 54.

Figure 7:
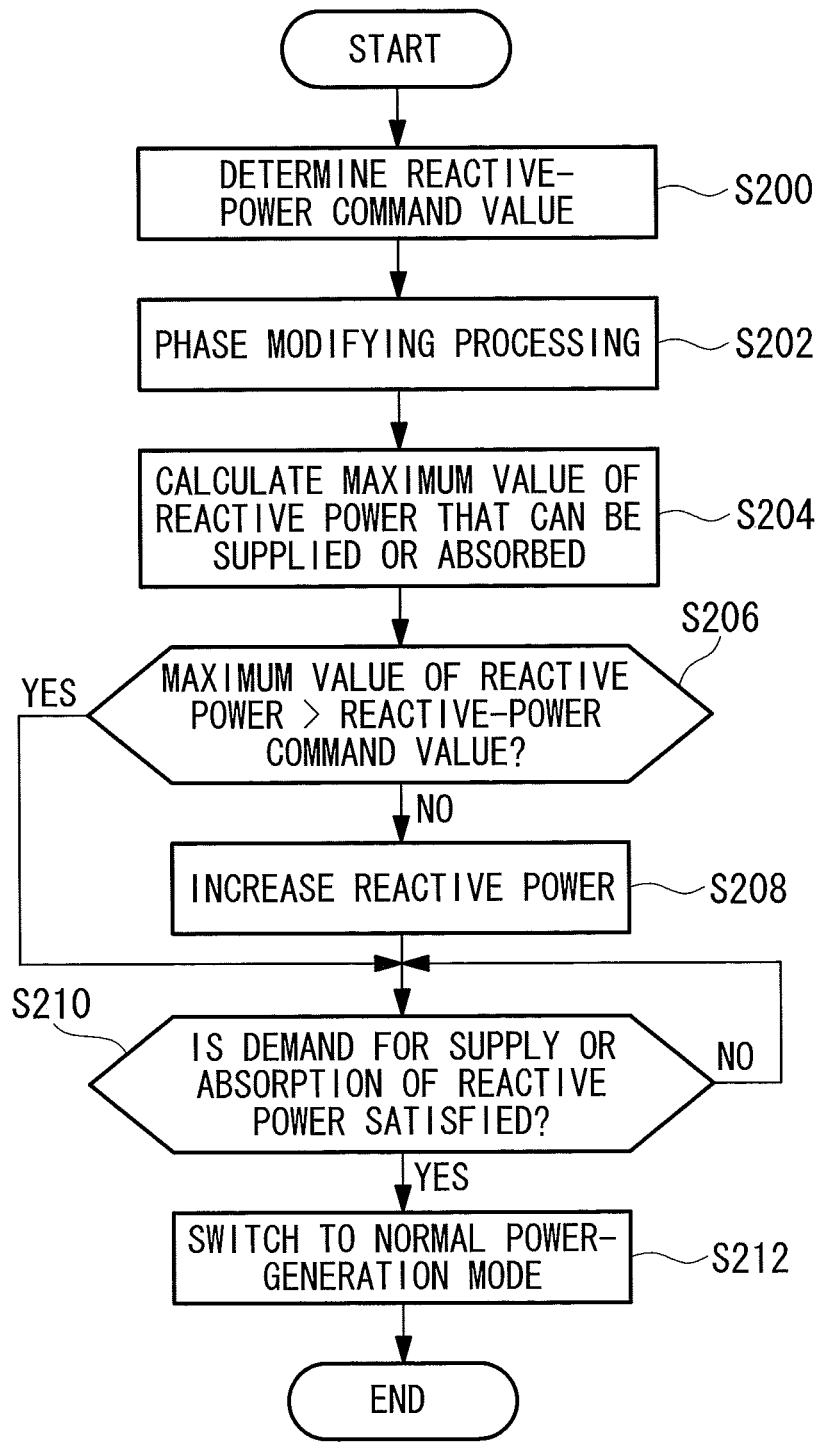
FIG. 7 is a flowchart showing the flow of reactive-power handling processing performed by the wind farm according to the second embodiment of the present invention.

FIG. 7 is a flowchart showing the flow of the reactive-power handling processing performed by the wind farm 80.

First, in Step 200, a reactive-power command value $Q_{total\_demand}$ that indicates the total amount of reactive power (target value or demand value) to be supplied to or absorbed from the utility grid 54 in the entire wind farm 80 is determined. The reactive-power command value is input to the wind farm 80 as a command from the grid manager. Alternatively, the reactive-power command value is set, as a target value, to the total amount of reactive power that is required to achieve a voltage target value $V_{total\_demand}$ or a power-factor target value $PF_{total\_demand}$ calculated based on the reactive-power measured value, the voltage measured value, or the power-factor measured value at the interconnection point, which is input to the wind-farm control system 82.

In the next Step 202, among the wind turbine generators 10 in the wind farm 80, the wind turbine generators 10 at which the wind speed is equal to or lower than the cut-in wind speed or is equal to or higher than the cut-out wind speed are used as reactive power sources for supplying the reactive power to the utility grid 54, through the phase modifying processing, described in the first embodiment. Note that, in the following explanation, an operation in which the synchronous generator 30 is used as the synchronous condenser is referred to as a reactive-power mode, and an operation in which power is generated by the synchronous generator 30 is referred to as a normal power-generation mode, as shown in FIG. 6.

Note that the wind-farm control system 82 determines the timing at which to switch from the normal power-generation mode to the reactive-power mode, determines the number of wind turbine generators 10 to be switched to the reactive-power mode, and selects the wind turbine generators 10 to be switched thereto. Then, the wind-farm control system 82 sends control command values to the wind turbine generators 10 to be switched from the normal power-generation mode to the reactive-power mode.

Furthermore, in selecting the wind turbine generators 10 whose mode will be switched, the operating conditions of the individual wind turbine generators 10 are compared, and the mode of the wind turbine generators 10 that output a low active power may be switched preferentially.

In the next Step 204, the wind-farm control system 82 calculates a maximum value $Q_{total\_max}$ of the reactive power that can be supplied or absorbed by the wind farm 80 through the phase modifying processing of the wind turbine generators 10.

In the next Step 206, the wind-farm control system 82 determines whether the calculated maximum value $Q_{total\_max}$ of the reactive power is larger than the reactive-power command value $Q_{total\_demand}$. If the determination result is affirmative, the processing flow advances to Step 210. If the determination result is negative, the processing flow advances to Step 208.

In Step 208, the wind farm 80 increases the reactive power to be supplied to or absorbed from the utility grid 54.

Figure 8:
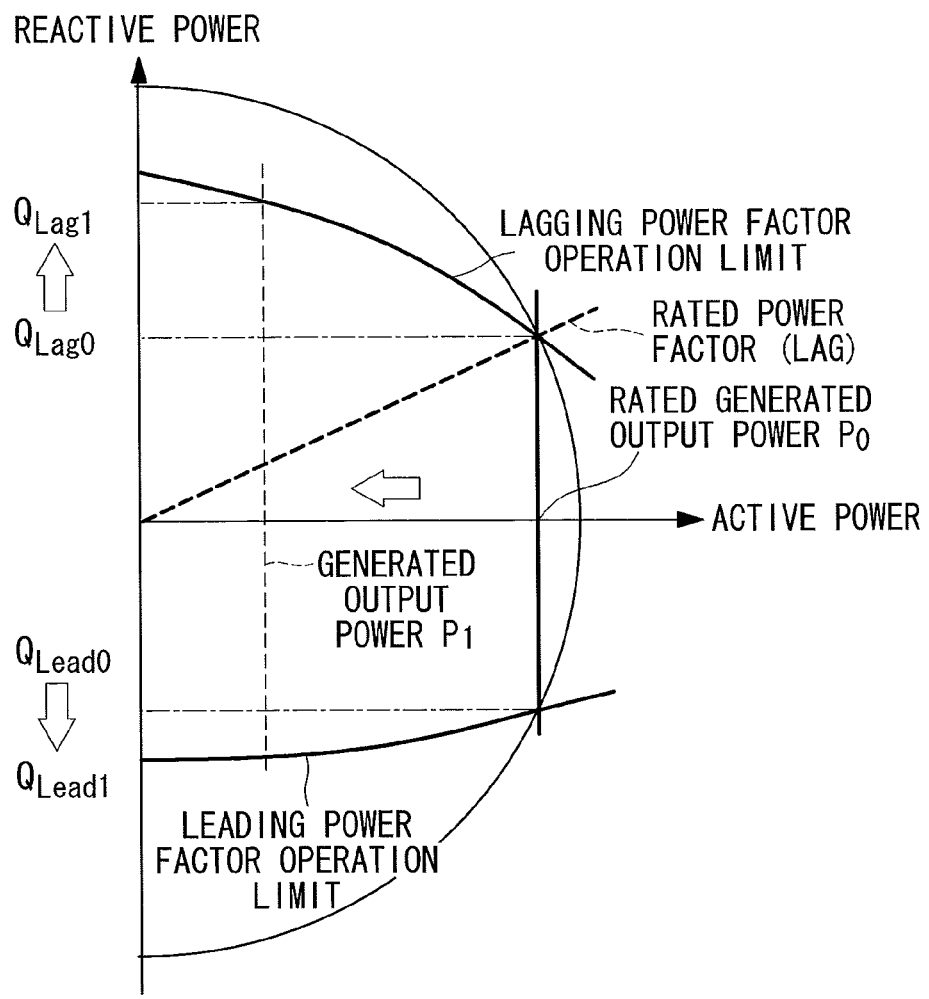
FIG. 8 is a graph showing the relationship between reactive power and active power.

Specifically, as indicated by the relationship between the reactive power and the active power shown in FIG. 8, by limiting or stopping the generated output power of some or all of the wind turbine generators 10 that are operated in the normal operation mode, which is an operation mode used when the wind speed is higher than the cut-in wind speed or is lower than the cut-out wind speed, the active power is reduced to increase the reactive power, which is adjustable, thus achieving the total amount of reactive power indicated by the reactive-power command value $Q_{total\_demand}$.

Figure 9:
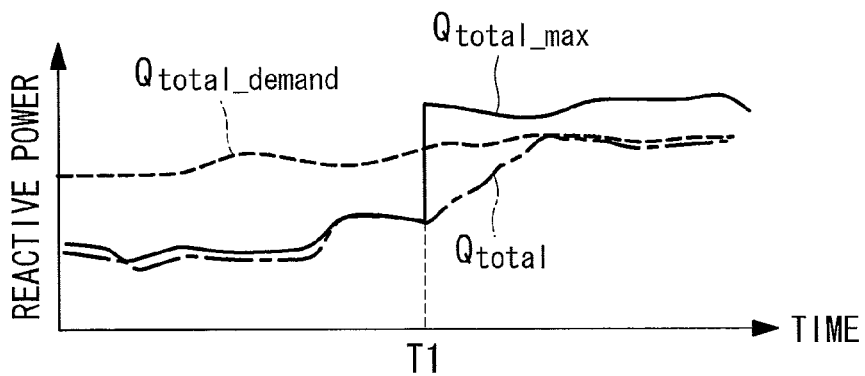
FIG. 9 is a graph showing temporal changes in the reactive power supplied to the utility grid from the wind farm according to the second embodiment of the present invention.

FIG. 9 is a graph showing temporal changes in the reactive power supplied to the utility grid 54 from the wind farm 80 of the second embodiment.

Until time T1, supplying reactive power to the utility grid 54 from the wind turbine generators 10 that are operated in the normal operation mode is not taken into account. Specifically, only the wind turbine generators 10 that are operated in the reactive-power mode supply reactive power. Thus, the total amount of reactive power $Q_{total}$ that is actually supplied from the wind farm 80 to the utility grid 54 is the same as the maximum value $Q_{total\_max}$ of the reactive power and is equal to or lower than the reactive-power command value $Q_{total\_demand}$.

Thus, the maximum value $Q_{total\_max}$ of the reactive power that is obtained in consideration of the reactive power supplied from the wind turbine generators 10 that are operated in the normal operation mode is calculated, and, thereafter, the reactive power is supplied also from the wind turbine generators 10 that are operated in the normal operation mode such that the total amount of reactive power $Q_{total}$ reaches the reactive-power command value $Q_{total\_demand}$.

Note that whether the generated output power is reduced or stopped for some or all of the wind turbine generators 10 that are operated in the normal operation mode is determined by the wind-farm control system 82 such that the operational efficiency can be maximized or at least one of active power loss and reactive power loss can be minimized, with the reactive-power command value $Q_{total\_demand}$ being used as the constraint condition.

In the next Step 210, the wind-farm control system 82 determines whether demand for supply or absorption of the reactive power has been satisfied. If the determination result is affirmative, the processing flow advances to Step 212. If the determination result is negative, the wind farm 80 continues to supply or absorb the reactive power with respect to the utility grid 54 until this demand is satisfied.

In Step 212, the wind-farm control system 82 switches all the wind turbine generators 10 constituting the wind farm 80 to the normal power-generation mode and ends this processing.

Furthermore, when the active power in the utility grid 54 is in excess, the wind farm 80 performs active-power absorbing processing for causing the wind turbine generators 10 to absorb the active power.

Figure 10:
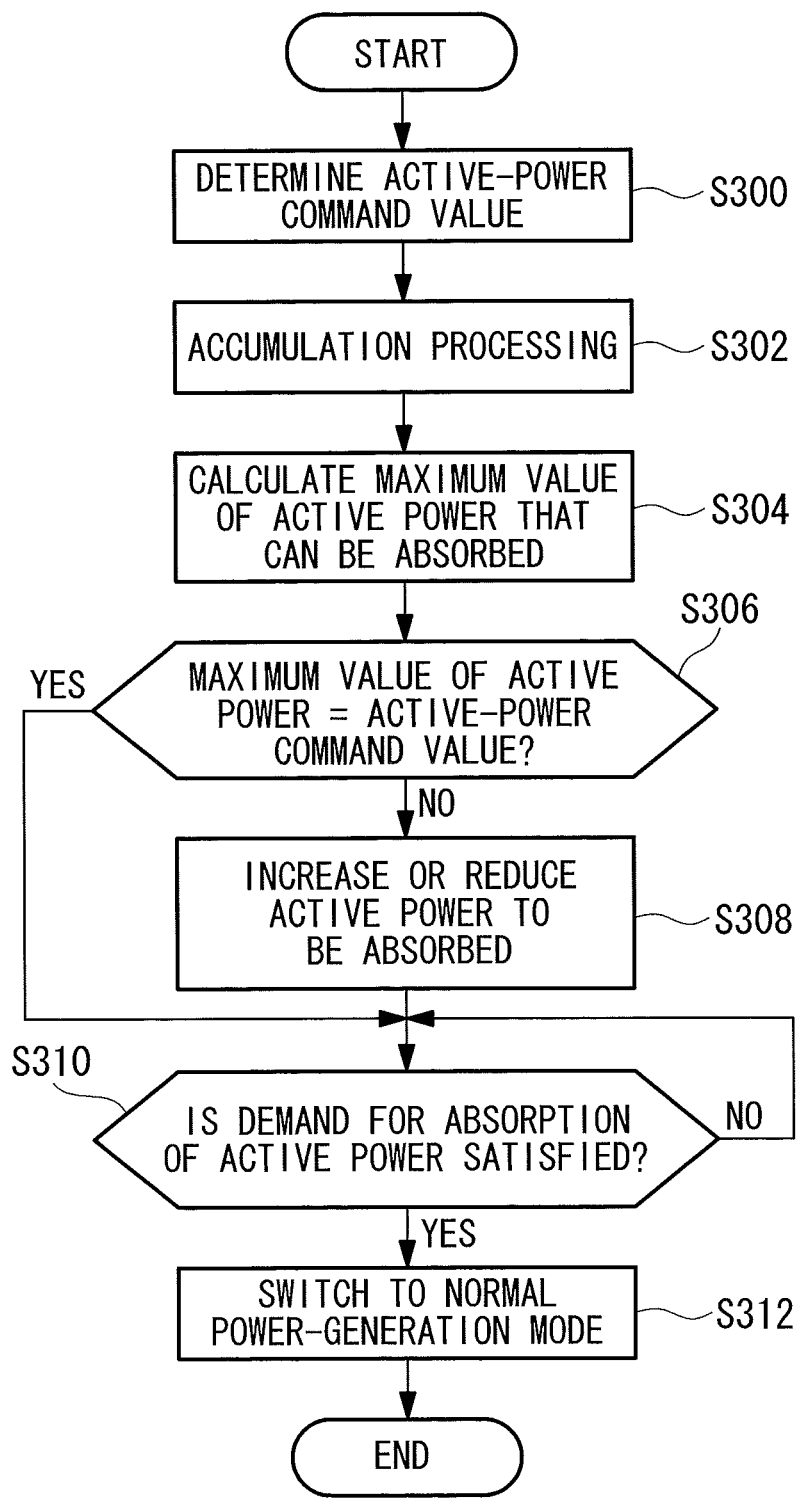
FIG. 10 is a flowchart showing the flow of active-power absorbing processing performed by the wind farm according to the second embodiment of the present invention.

FIG. 10 is a flowchart showing the flow of the active-power absorbing processing performed by the wind farm 80.

First, in Step 300, an active-power command value that indicates the total amount of active power (target value or demand value) to be absorbed from the utility grid 54 in the entire wind farm 80 is determined. The active-power command value is input to the wind farm 80 as a command from the grid manager. Alternatively, the active-power command value is determined based on the active-power measured value at the interconnection point, which is input to the wind-farm control system 82, such that the active power reaches a predetermined value (see FIG. 11).

Figure 11:
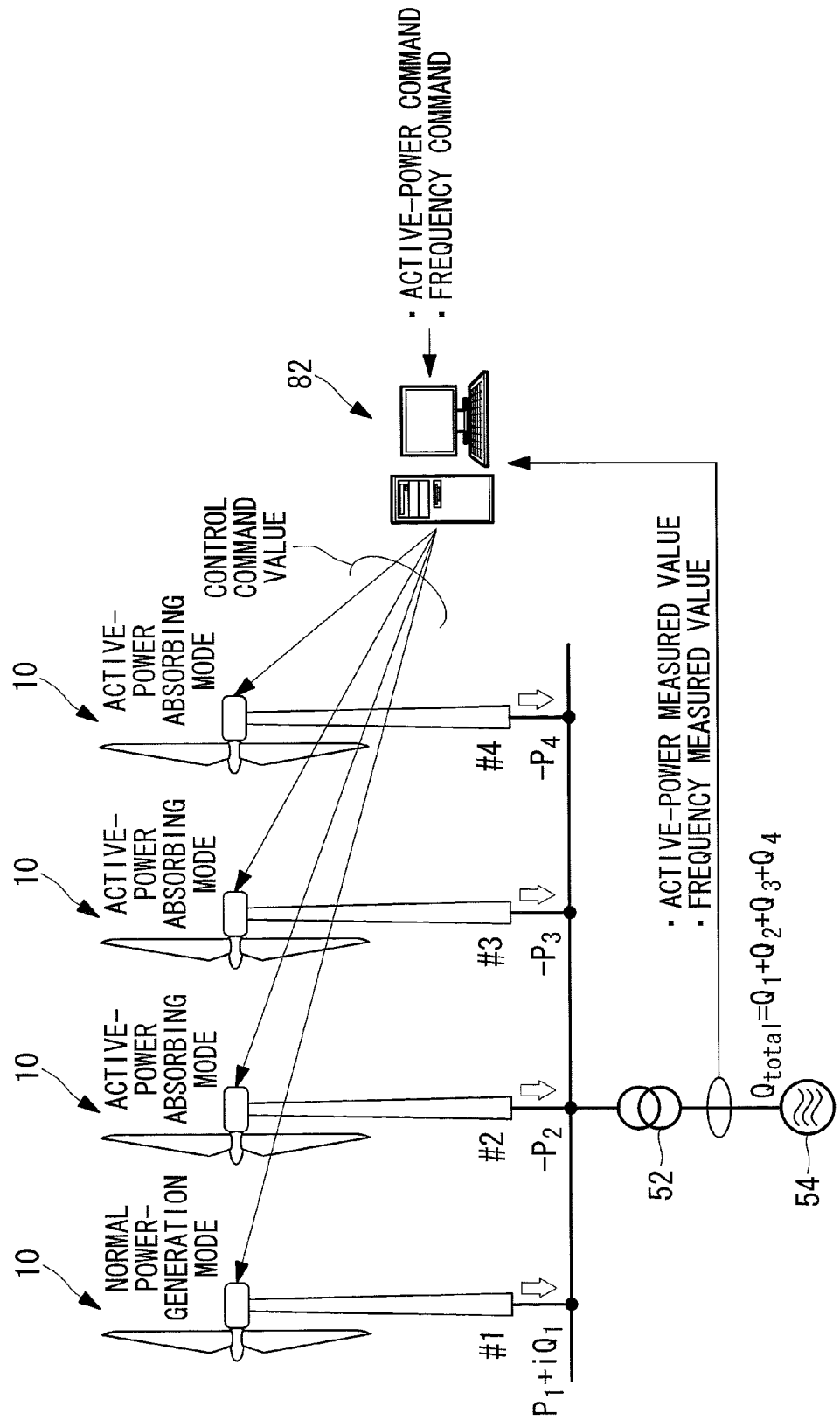
FIG. 11 is a view for explaining the active-power absorbing processing performed by the wind farm according to the second embodiment of the present invention.

In the next Step 302, power generation performed by some of the wind turbine generators 10 in the wind farm 80 is stopped, and the active power is absorbed from the utility grid 54 through the accumulation processing, described in the first embodiment. Note that, in the following explanation, an operation in which the accumulation processing is performed is referred to as an active-power absorbing mode, as shown in FIG. 11.

Note that the wind-farm control system 82 determines the timing at which to switch from the normal power-generation mode to the active-power absorbing mode, determines the number of wind turbine generators 10 to be switched to the active-power absorbing mode, and selects the wind turbine generators 10 to be switched thereto. Then, the wind-farm control system 82 sends control command values to the wind turbine generators 10 to be switched from the normal power-generation mode to the active-power absorbing mode.

Furthermore, in selecting the wind turbine generators 10 whose mode will be switched, the operating conditions of the individual wind turbine generators 10 are compared, and the mode of the wind turbine generators 10 that output a low active power may be switched preferentially.

In the next Step 304, the wind-farm control system 82 calculates the maximum value of the active power that can be absorbed by the wind farm 80 through the accumulation processing of the wind turbine generators 10.

In the next Step 306, the wind-farm control system 82 determines whether the calculated maximum value of the active power is equal to the active-power command value. If the determination result is affirmative, the processing flow advances to Step 310. If the determination result is negative, the processing flow advances to Step 308.

In Step 308, the number of wind turbine generators 10 whose mode will be switched to the active-power absorbing mode is increased or reduced, thus increasing or reducing the active power to be absorbed by the wind farm 80 from the utility grid 54.

In the next Step 310, the wind-farm control system 82 determines whether demand for absorption of the active power has been satisfied. If the determination result is affirmative, the processing flow advances to Step 312. If the determination result is negative, the wind farm 80 continues to absorb the active power from the utility grid 54 until this demand is satisfied.

In Step 312, the wind-farm control system 82 switches all the wind turbine generators 10 constituting the wind farm 80 to the normal power-generation mode and ends this processing.

The present invention has been described above by using the above-described embodiments; however, the technical scope of the present invention is not limited to the scope of the description of the above-described embodiments. Various modifications or improvements can be added to the above-described embodiments without departing from the gist of the invention, and configurations to which such modifications or improvements are added are also encompassed in the technical scope of the present invention.

For example, in the above-described embodiments, a description has been given of the configuration of the wind turbine generator 10 in which the rotation of the rotor 18 is speeded up by the hydraulic pump 32 and the hydraulic motor 38 and is transferred to the synchronous generator 30; however, the present invention is not limited thereto. For example, a configuration of the wind turbine generator in which the rotation of the rotor 18 is speeded up by a gear box and is transferred to the synchronous generator 30 is permissible. Note that, in this configuration, since the accumulator 46 is not provided, processing using the accumulator 46 cannot be performed.

Furthermore, in the above-described embodiments, a description has been given of the configuration in which the interconnected synchronous generator 30 is used as the synchronous condenser when no mechanical power is transferred to the synchronous generator 30; however, the present invention is not limited thereto. For example, the synchronous generator 30 may be used as the synchronous condenser when mechanical power allowing output of active power corresponding to the power consumption of the wind turbine generator 10 is transferred. In this configuration, the wind turbine generator 10 can supply reactive power to the utility grid 54 and can also supply active power for the power consumption of the wind turbine generator 10 to the utility grid 54.

Furthermore, in the above-described embodiments, a description has been given of a configuration in which the case where no mechanical power is transferred to the synchronous generator 30 corresponds to the case where the wind speed is equal to or lower than the cut-in wind speed or is equal to or higher than the cut-out wind speed; however, the present invention is not limited thereto. For example, also permissible is a configuration in which the case where no mechanical power is transferred to the synchronous generator 30 is made to correspond to a case where the rotor rotational speed is equal to or lower than a predetermined rotational speed, and the synchronous generator 30 is operated as the synchronous condenser, thus controlling the magnitude of the field current of the synchronous generator 30.

Furthermore, the processing flows, described in the above-described embodiments, are merely examples. An unnecessary step may be deleted, a new step may be added, and the processing order may be changed, without departing from the gist of the present invention.

REFERENCE SIGNS LIST 10 wind turbine generator
18 rotor
20 blades
30 synchronous generator
32 hydraulic pump
38 hydraulic motor
46 accumulator
60 wind-turbine control system
66 hydraulic drive control section
67 field control section
68 generator control section
80 wind farm

The invention claimed is:

1. A wind-turbine-generator control system for a wind turbine generator that generates power with a synchronous generator through rotation of a rotor having blades, comprising a generator control unit for operating the synchronous generator as a synchronous condenser in a state in which the wind turbine generator is interconnected to a utility grid, and the synchronous generator reaches a synchronous speed, if mechanical power transferred to the synchronous generator is equal to or lower than a predetermined value, thus controlling a magnitude of field current of the synchronous generator.

2. A wind-turbine-generator control system according to claim 1, wherein the wind turbine generator is provided with a hydraulic pump that pumps hydraulic oil by rotation of the rotor; a hydraulic motor that is rotated with the hydraulic oil pumped out from the hydraulic pump, thus rotationally driving the synchronous generator at a rotational speed that is equal to or higher than a rotational speed of the rotor; and an accumulator that is provided in a high-pressure pipe for delivering the hydraulic oil from the hydraulic pump to the hydraulic motor and that accumulates the hydraulic oil flowing from or to the hydraulic pump and the hydraulic motor, the wind-turbine-generator control system further comprising a hydraulic control unit for controlling the hydraulic pump and the hydraulic motor.

3. A wind-turbine-generator control system according to claim 2, wherein, when the synchronous generator has not reached the synchronous speed, the hydraulic control unit rotates the hydraulic motor with the hydraulic oil accumulated in the accumulator, thus making the synchronous generator reach the synchronous speed.

4. A wind-turbine-generator control system according to claim 2, wherein the generator control unit operates the synchronous generator as the synchronous motor, thereby operating the hydraulic motor as a hydraulic pump and pressurizing and accumulating the hydraulic oil in the accumulator even when the rotor is not rotated.

5. A wind-turbine-generator control system according to claim 1, wherein, if the mechanical power transferred to the synchronous generator is higher than the predetermined value, the synchronous generator stops being used as the synchronous condenser and generates power.

6. A wind-turbine-generator control system according to claim 1, wherein whether the mechanical power transferred to the synchronous generator is equal to or lower than the predetermined value is determined based on the wind speed or the rotational speed of the rotor.

7. A wind turbine generator comprising a wind-turbine-generator control system according to claim 1.

8. A wind farm comprising a plurality of wind turbine generators according to claim 7.

9. A wind farm according to claim 8, wherein the synchronous generators of the plurality of wind turbine generators are used as synchronous condensers according to the total amount of reactive power to be supplied to the utility grid.

10. A wind farm according to claim 8, wherein generated output powers of some or all of the wind turbine generators that are operated in a normal operation mode are limited or stopped, thus increasing adjustable reactive power.

11. A wind-turbine-generator control method for a wind turbine generator that generates power with a synchronous generator through rotation of a rotor having blades, the control method comprising operating the synchronous generator as a synchronous condenser in a state in which the wind turbine generator is interconnected to a utility grid, and the synchronous generator reaches a synchronous speed, if mechanical power transferred to the synchronous generator is equal to or lower than a predetermined value, thus controlling a magnitude of field current of the synchronous generator.

* * * * *